United States Patent [19]

Pool

[11] 4,046,164
[45] Sept. 6, 1977

[54] LIFT CHECK VALVE WITH DASHPOT

[75] Inventor: Eldert B. Pool, Pittsburgh, Pa.

[73] Assignee: Rockwell International Corporation, Pittsburgh, Pa.

[21] Appl. No.: 622,007

[22] Filed: Oct. 14, 1975

[51] Int. Cl.[2] ............................................ F16K 15/06
[52] U.S. Cl. ................................................. 137/514.7
[58] Field of Search ....................... 137/514.7; 251/50

[56] References Cited

U.S. PATENT DOCUMENTS

| | | | |
|---|---|---|---|
| 816,216 | 3/1906 | Cash | 137/514.7 |
| 1,029,600 | 6/1912 | Foster | 137/514.7 |
| 2,216,296 | 10/1940 | Raymond | 137/514.7 X |

FOREIGN PATENT DOCUMENTS

| | | | |
|---|---|---|---|
| 1,906,305 | 9/1970 | Germany | 251/50 |

Primary Examiner—Robert G. Nilson

[57] ABSTRACT

An improved check valve has an operating chamber with a disc disposed therein which is capable of axial movement from a closed position against a valve seat to an opened position to prevent feedwater from flowing from the normal outlet to the normal inlet of the valve. A cylindrical member extends upwardly from the disc through a fixedly mounted baffle plate which generally separates an upper portion of the operating chamber from the lower portion. A piston is mounted on an extended end of the cylindrical member to generally define a dashpot chamber between the piston and the baffle plate. The dashpot chamber entraps a greater volume of feedwater when the valve is open than when closed to limit valve closure rate by limiting the rate at which feedwater leaves the dashpot chamber during closure.

9 Claims, 2 Drawing Figures

LIFT CHECK VALVE WITH DASHPOT

BACKGROUND OF THE INVENTION

1 Field of the Invention

This invention relates to a lift check valve and, more specifically, to such a check valve which may be utilized in the discharge line of a feedwater pump for a nuclear power system.

2. Description of the Prior Art

Heretofore, lift check valves similar to that disclosed in U.S. Pat. No. 2,665,877 have been utilized on the discharge side of the feedwater pumps in nuclear power plants to prevent backflow through a non-operating pump as might occur when other pumps in the system are being operated. The check valve is opened by normal flow from the pump and will close when flow discontinues. With the cessation of normal flow, gravity acts on the dics to lower it into the feedwater stream where any reverse flow causes the disc to fully seat. An automatic, self-operating valve is desirable whenever possible in a feedwater system of a nuclear power plant because it is selfcontained and does not require the pressure boundary to be penetrated. This decreases the likelihood of leakage and eliminates the need for packing which an externally operated valve might require.

As seen in U.S. Pat. No. 2,665,877, as well as U.S. Pat. No. 2,688,980, which are incorporated herein by reference, an equalizing line is utilized in the feedwater system to insure that the valve is fully withdrawn from the pump discharge flow path during pump operation. Specifically, the equalizing line communicates with the downstream side of the valve where it is subjected to a lower pressure than that acting on the valve disc because of fluid pressure drops through the line. With the other end of the equalizing line communicating with the region above the valve, the resulting differential pressure with the region above the valve, the resulting differential pressure acting on the valve overcomes gravitational forces on the valve and causes it to be fully withdrawn from the flow stream during expected normal flow rates.

With an increased emphasis on safety and reliability of all features of nuclear power plant systems, consideration has been given to the effect of an instantaneous, complete rupture of the feedwater pipe between the pump and the lift check valve. A mathematical analysis, using accepted engineering and analytical methods, has indicated that a lift check valve similar to that disclosed in U.S. Pat. No. 2,665,877 would not operate satisfactorily under such a demanding condition. For the purposes of this analysis, it was assumed that the feedwater system included water at 1,250 p.s.i. and 420° F with a flow rate of 5,220,000 pounds per hour away from the impending break. This flow rate was determined to be about 23 feet per second through a 15½ inside diameter line in which an 18 inches lift check valve would be utilized. The valve utilized in the analysis was somewhat different from the valve of U.S. Pat. No. 2,665,877, however, in that it had an operating chamber which was oriented at a 45° angle (as will be obvious from the preferred embodiment of the invention as shown in FIG. 1) with respect to the feedwater line in which it was installed. The calculations took into effect such items as the fact that the water could be expected to progressively turn into saturated stream at about 300 p.s.i. after the rupture and generally assumed the most favorable parameters for valve operation.

It was still found, however, that excessive seat impact and excessive water hammer surge pressures would result. Specifically, the valve of the above mentioned analysis would produce severe plastic deformation of the seat as a result of a seating velocity of 90 feet per second and a surge pressure in the feedwater line of over 1,000 p.s.i., in addition to the 1,250 p.s.i. operating pressure of the feedwater. The chamfered seat of the valve, for example, might be plastically deformed axially as much as one-fourth of an inch to prevent a satisfactory sealed closure after the rupture. The excessive surge pressure could have a detrimental effect on any number of components within the system and might, for example, overload the pipe supports and cause their failure.

Since it was apparent that a simple lift check valve would not satisfactorily withstand such a criteria, the use of an alternative, existing valve was considered. For example, it was felt that an externally operated valve such as disclosed in U.S. Pat. No. 3,888,280 and incorporated herein by reference, could be employed. The valve disclosed therein would be automatically closed by activation of its external controls when an associated sensing system sensed a loss of feedwater pressure. However, unless modified, this valve is intended to require three to five seconds for complete closure allowing a significant loss of feedwater. Additionally, there are a number of features of the valve of U.S. Pat. No. 3,888,280 which make it unattractive as an alternative to the prior feed pump check valve. Since the valve is an externally operated valve, it includes a significant number of elements which should not be needed for a check valve. The valve is relatively expensive, requires that the pressure boundary be penetrated and generally requires additional space which complicates system design.

SUMMARY OF THE INVENTION

It is therefore an object to provide a lift check valve for the pump discharge line which would satisfactorily close after an instantaneous, complete rupture of the pipe between the valve and the pump.

It is a further object to provide a valve of the type described which will not result in an excessive seat impact after such a rupture.

It is another object to provide a valve of the type described which will not produce an excessive water hammer surge pressure after such a rupture.

It is still another object to provide a valve of the type described which can be maintained within the pressure boundaries of the system without requiring external operating means.

It is yet another object to provide a valve of the type described which is relatively inexpensive, simple to produce, and minimizes space requirements within the feedwater system.

To accomplish these and other objects of the invention, a preferred embodiment thereof includes an improved lift check valve of the type which has an operating chamber with an inlet and an outlet of said valve communicating with a lower portion of said operating chamber. The operating chamber has a disc disposed within the lower portion for axial movement from a closed position to an opened position. The disc at the closed position is against a mating valve seat of the lower portion to prevent flow through the operating chamber from the outlet to the inlet. The disc is at the opened position away from the seat to allow flow from the inlet fitting to the outlet fitting. The improvement includes a baffle plate which is fixedly mounted at an intermediate location within the operating chamber to generally separate an upper portion thereof from the lower portion. A cylindrical member extends axially from said disc in a direction away from said seat through an axial opening in the baffle plate to be slidably received therein with an extended end of the cylindrical member being located within the upper portion. A piston is mounted on the extended end of the cylindrical member to extend radially therefrom toward an interior surface of the upper portion. The piston, the interior surface and the baffle plate generally define a dashpot chamber of the valve within the upper portion. The dashpot chamber has a predetermined volume of the liquid therein when the disc is in the opened position and a lesser volume of said liquid when the disc is in the closed position. The improvement includes means for limiting the rate to which the liquid leaves the dashpot chamber as the disc moves from the opened position to the closed position.

DETAILED DESCRIPTION OF THE PREFERRED EMBODIMENT

Figure 1:
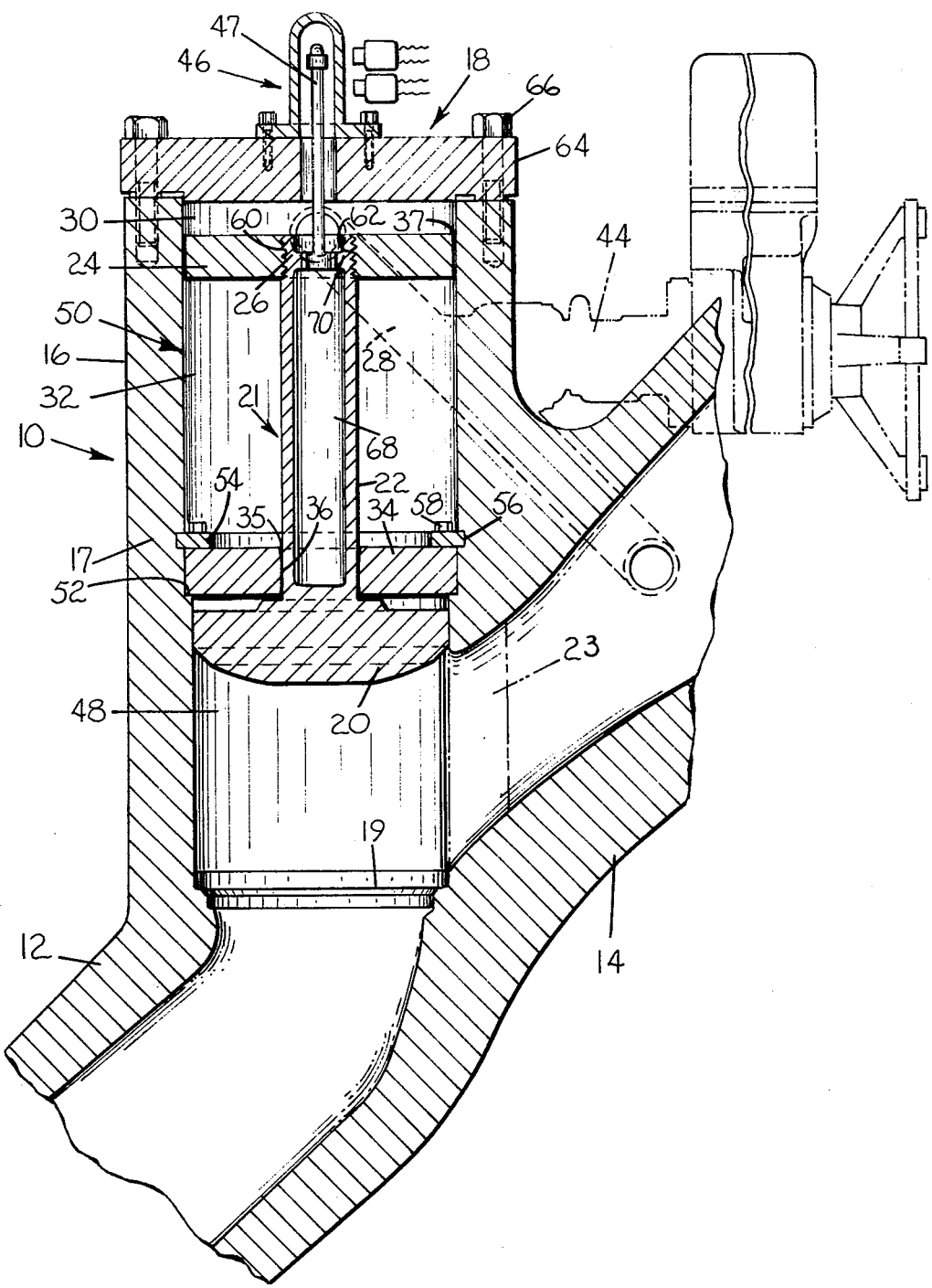
FIG. 1 is a sectional, side elevation of the preferred lift check valve, including various features of the invention and in an opened position for normal pump operation.
Figure 2:
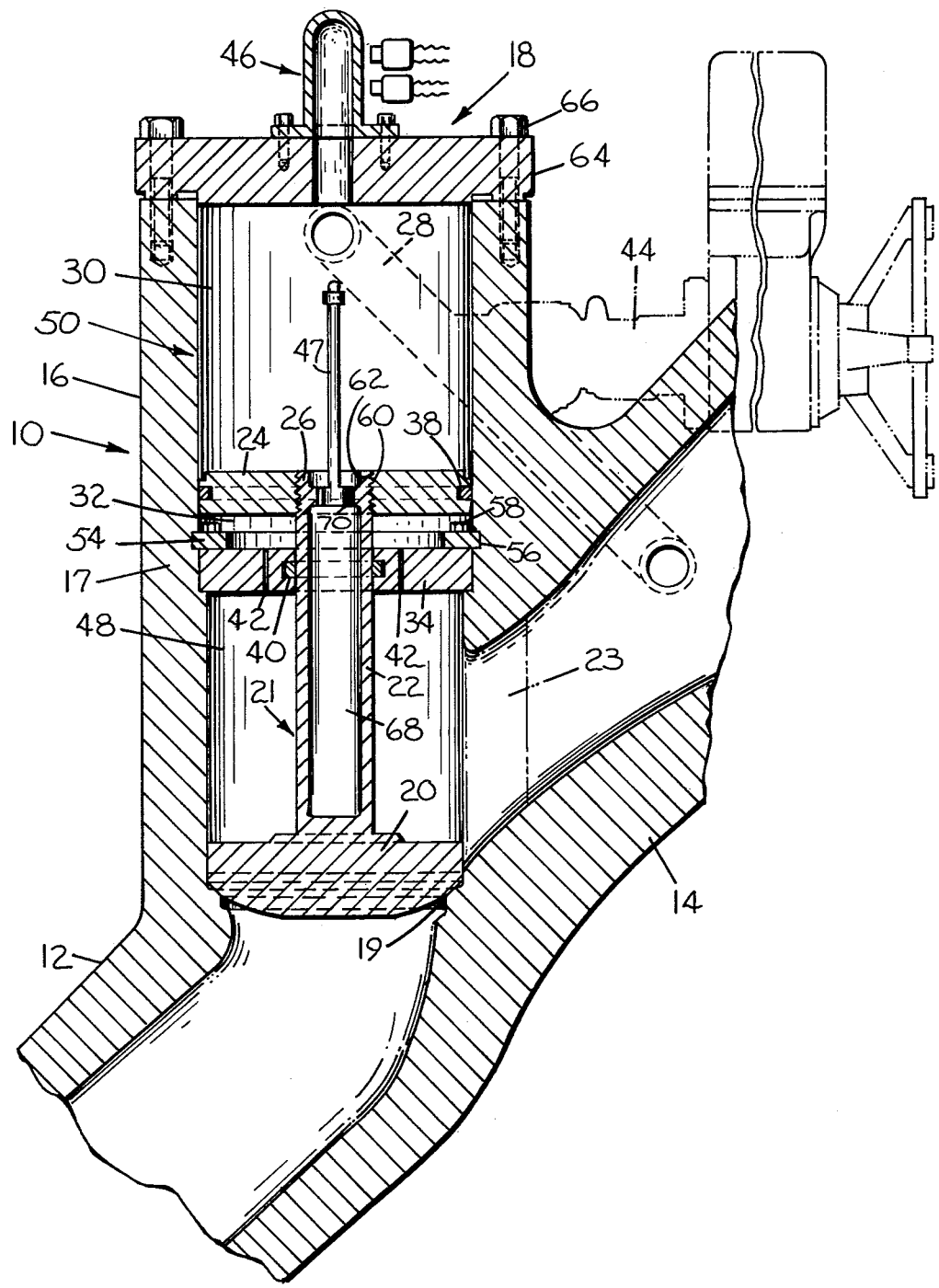
FIG. 2 is a view of the valve, as shown in FIG. 1, in the closed position and including alternative features of the invention.

As seen in FIGS. 1 and 2, a lift check valve 10 includes an inlet pipe 12 and an outlet pipe 14 for flow therethrough from the lower left of the figures to the upper right during normal pump operation. A valve operating chamber 16 is disposed at about a 45° angle with respect to the inlet pipe 12 and outlet pipe 14 and includes a cylindrical side wall 17 and sealed end closure 18. The operating chamber 16 also includes a seat 19 against which a disc 20 is positioned to prevent a backflow through the valve 10 when the pump (not shown) is stopped or when the upstream pipe is ruptured as discussed hereinabove. A disc guidepost 23 (shown in phantom lines) insures that the disc 20 will be maintained in alignment with the seat 19 during closure but does not interfere with flow through the valve when opened. In addition to the disc 20, an operating portion 21 of the valve 10 includes a cylindrical member 22 extending upwardly from the disc 20 and a piston 24 secured to the extended end 26 of the cylindrical member 22.

In the opened position, as shown in FIG. 1, the valve 10 operates in a manner similar to that of the valve as disclosed in U.S. Pat. No. 2,665,877. As discussed hereinabove, the disc 20 is generally displaced from the seat 19 toward the opened positon by feedwater pump flow from the inlet pipe 12 to the outlet pipe 14. An equalizing line 28 extends from an upper chamber 30 of the operating chamber 16 to the outlet pipe 14 to cause downstream pressure to act upon the upper surface of the piston 24. Since the pressure in the upper chamber 30 will be less than the pressure acting upon the disc 20 from below, the operating portion 21 of the valve 10 will remain at a fully opened position during expected flow rates despite the natural gravitational forces which tend to lower it into the flow path.

However, upon stopping the pump or rupturing the pipe as described hereinabove, an internal dashpot 32 of the valve 10 controls closure rate. The dashpot 32 is generally defined by the piston 24, the cylindrical side wall 17 and a baffle plate 34 which encircles the cylindrical member 22. The baffle plate 34 is fixedly mounted within the operating chamber 16 to allow relative movement therethrough of the cylindrical member 22 as the operating portion 21 moves between the opened and closed positions. When normal flow through the valve 10 is disrupted, the weight of the operating portion 21 and other forces acting on the disc 20 will tend to close the valve. However, movement with respect to the baffle plate 34 is opposed by the presence of entrapped liquid between the baffle plate 34 and the piston 24. Some of the water within the dashpot 32 in the preferred embodiment of FIG. 1 escapes through a gap 35 of predetermined size between the cylindrical member 22 and the opening 36 of the baffle plate 34 through which it extends. Additionally, the water can escape through a gap 37 of predetermined size between the cylindrical wall 17 and the piston 24 toward the upper chamber 30. Restricting flow by the piston 24 and around the cylindrical member 22 decreases the speed at which the operating portion 21 can be lowered.

The dashpot 32 can continue to provide resistance throughout closure to prevent damage to the seat 19 or excessive surge pressures even under the extreme conditions of pipe rupture described hereinabove. The size of gaps 35 and 37 can be decreased by design to provide a slower rate of closure. However, there is a point at which mechanical jamming between the members might occur if the gaps are too small.

As seen in FIG. 2, flow by the piston 24 and flow by the cylindrical member 22 could alternately be controlled at a lesser rate without this type of mechanical jamming by the addition of sealing rings 38 and 40, respectively. The sealing ring 38 encircles the piston 24 to make sliding contact with the cylindrical side wall 17 throughout the downward movement. The sealing ring 40 is mounted within the baffle plate 34 to encircle the cylindrical member 22 to make sliding contact therewith throughout closure of the operating portion 21. Additionally, flow from the dashpot 32 to the operating chamber 16 below the baffle plate 34 could be provided by drilling holes 42 through the baffle plate 34. Although the sealing rings 38 and 40 and holes 42 provide design flexibility for varying the embodiment of FIG. 1, the sealing rings 38 and 40 are not inexpensive to provide, would tend to complicate assembly and maintenance and introduce into the valve components which could break or fail to thereby increase the possibility of the valve sticking or jamming in an opened or closed position. It has been found that proper tolerances for predetermined control of the size of the gaps 35 and 37 can be empolyed to effectively control the rate of the closure in the preferred system without fear of jamming and without these alternative features being needed.

By a similar mathematical analysis, using accepted engineering and analytical methods, of the preferred check valve 10, and of the alternative features which could be used to affect closure, satisfactory valve closure has been verified. In the analysis, it was assumed that the various complex forces acting to close the valve were in the worst condition possible, to insure that proper closure would be obtained. The results are shown for four specific alternatives hereinbelow:

| Alternative Features | Seating Velocity ft/sec | Closing Time sec | Est. Surge (Over 1,250 p.s.i.) p.s.i. |
|---|---|---|---|
| No Piston Ring (.028" dia. clearance) No Baffle Ring (.178" dia. clearance) | 5 | 0.23 | 160 |
| No Piston Ring (.028" dia. clearance) No Baffle Ring (.040" dia. clearance) | 1.44 | 0.79 | 47 |
| 1 Piston Ring No Baffle Ring | 1 | 1.15 | 37 |
| 1 Piston Ring 1 Baffle Ring 2 Holes 0.21" dia. | 0.164 | 7.0 | 5 |

The preferred configuration is the second alternative listed above. It was determined that during the 0.79 second closing time the feedwater outflow through a rupture would be limited to an acceptable, reasonable value of about 1,000 pounds of feedwater which would be less than one-fourth of the initial contents of the feedwater line.

To fully understand the operation of the valve 10 during closure, it should be pointed out that controlling the amount of water within the upper chamber 30 during closure is not required. Specifically, the rate at which the piston 24 is lowered results in a rapid increase in the volume of the chamber 30 which cannot be filled of feedwater flowing through the equalizing line 28 so that the feedwater in the chamber 30 cannot be maintained in a liquid state throughout closure. However, since the feedwater is at an elevated temperature, water generally entrapped within the upper chamber will flash into steam so that closure will not be unduly hampered as might be the case if the water were expected to remain in a liquid state. Accordingly, since feedwater within the upper chamber 30 can be expected to boil during closure, it is not the increasing of the volume of the upper chamber 30 but the decreasing of the volume of the dashpot 32, as feedwater in a liquid state is entrapped there, which retards closure.

There are two features of the check valve 10 which are preferred in a final installation, but are considered to be outside the scope of this invention. An isolation valve 44 has been installed in the equalizing line 28 so that it may be selectively, remotely closed to isolate the downstream pressure from the upper chamber 30. When the isolation valve 44 is closed, the operating portion 21 will be lowered by gravity as discussed hereinabove without significantly interferring with normal feedwater flow. For increased reliability on the check valve 10, it has been determined that a means for periodically verifying that the check valve is free to close is also needed. The remote controlled isolation valve 44 in the equalizing line 28 provides such a means and is fully disclosed in the co-pending application U.S. Ser. No. 622,070 entitled Valve Exerciser by Donn W. Duffey and Ralph W. Tartaglia, filed on Oct. 14, 1975 and assigned to the assignee of the present invention. Also included in the above cited application and explained in detail therein is a valve position indicator 46 which includes an indicator rod 47 and is utilized to determine valve position during testing. It is of significance that operation of the isolation valve 44 and the indicator 46 are made possible without any penetration of the pressure boundary which is in keeping with the general objectives of a proper check valve for the feedwater system of a nuclear power plant.

There are other features of the preferred valve 10 which have not been discussed hereinabove, but which make the valve inexpensive to manufacture, easy to assemble and simple to maintain. During installation, the disc 20 with the cylindrical member 22 fixedly mounted thereon is initially installed within the cylindrical side wall 17. A lower portion 48 of the operating chamber 16 has an effective, uniform cross section to closely match that of the disc 20 throughout its movement from the opened to the closed position. An upper portion 50 of the operating chamber 16 has a cross section which is aligned with and slightly larger than that of the lower portion 48 to provide an intermediate transition shoulder 52 therebetween in the cylindrical wall 17.

The baffle plate 34, having a cross section corresponding to that of the upper portion 50 is next installed intermediately within the operating chamber 16 where it is supported by and rests against the shoulder 52 as the cylindrical member 22 is received within the opening 36. A segmented retaining ring 54 is positioned within an annular groove 56 in the upper portion 50 and bolted at 58 to the baffle plate 34 to maintain the baffle plate 34 in position throughout valve operation. The baffle plate 34 is so mounted against the shoulder 52 that only negligible leakage around its periphery can occur.

A threaded upper end 60 of the cylindrical member 22 is located within the upper chamber 50 throughout valve operation. The piston 24 includes a threaded opening 62 therethrough for receipt of the threaded end 60 for assembly of the operating portion 21. The piston 24 is locked to the cylindrical member 22 to insure it will be retained thereon. Assembly of the valve 10 is completed by bolting the cover plate 64 to the cylindrical wall 17 at 66 with appropriate sealing gaskets therebetween to seal the valve 10 against leakage.

It should be apparent to those skilled in the valve art, that the invention described hereinabove could be as easily employed in a stop-check valve as it can in the preferred valve 10. For example, since the cylindrical member 22 has a hollow interior 68, a designed removal of the position indicator 46, the indicator rod 47 and an upper end 70 of the cylindrical member 22 would result in a configuration similar to that shown in U.S. Pat. No. 2,665,877 discussed above. A stop-check valve would include an operating shaft which would sealably penetrate the end closure 18 to extend into the cylindrical member 22 to act on the back of the disc 20. If forced closure of the valve were desired, an operating mechanism disposed above the valve and outside the pressure boundary would be energized to lower the operating shaft and thus the disc 20 to the closed position. However, withdrawing the operating shaft would allow the disc 20 to operate as described hereinabove so that it would be free to open or close in the normal check valve fashion. In this condition, the invention as above described would control closure to prevent valve and system damage. Accordingly, the term "check valve" as used and described in the claims includes a stop-check valve of the type described or of a different configuration if the stop feature is not being utilized and the valve were free to operate as a check valve. It should therefore be obvious from the description provided hereinabove and from the figures that various alterations to the preferred embodiments could be made without departing from the scope of the invention as claimed.

What is claimed is:

1. An improved check valve of the type having a valve body with a passage therethrough intersected by an operating chamber terminating at the passage with a valve seat and a disc movable in the chamber toward a closed position engaging the valve seat by fluid flow forces in one direction and an open position spaced therefrom by fluid flow forces in the other direction, the improvement comprising: a cylindrical member connected at one end to the disc and at the other end to a piston having a peripheral surface adjacent the interior surface of the operating chamber and defining thereabove an upper chamber; a baffle plate in the operating chamber axially between said piston and said disc and surrounding said cylindrical member at an axial opening whereby said piston, said baffle means, said interior surface and cylindrical member define therebetween a dashpot chamber having a predetermined volume of liquid therein in the open position; means for limiting the rate at which liquid leaves the dashpot chamber as the disc moves from said open position to the closed position and thereby the closing rate of said disc; and conduit means fluidly communicating the upper chamber with the passage at a location upstream of the valve seat when the flow is in said one direction, said conduit means establishing a pressure balance between the upper chamber and said location providing an upward biasing on the piston for flow in said other direction and preventing fluid conditions in the upper chamber from retarding the closing rate for flow in said one direction whereby the closing rate is prescribed by the rate at which the liquid leaves the dashpot chamber.

2. An improved check valve in accordance with claim 1, wherein said means for limiting said rate includes a periphery of said piston and said interior surface having a predetermined gap therebetween restricting passage of the said liquid from within said dashpot chamber to the upper portion of said operating chamber above said piston.

3. An improved check valve in accordance with claim 2, wherein said means for limiting said rate includes at least one sealing ring mounted about an interior surface of said axial opening of said baffle plate to make sliding contact with an outer surface of said cylindrical member to restrict passage of said liquid from said dashpot chamber to said lower portion of said operating chamber.

4. An improved check valve in accordance with claim 1, wherein said means for limiting said rate includes an outer surface of said cylindrical member and said axial opening having a predetermined gap therebetween restricting passage of said liquid from within said dashpot chamber to the lower portion of said operating chamber below the baffle plate.

5. An improved check valve in accordance with claim 4, wherein said means for limiting said rate includes at least one sealing ring mounted about a periphery of said piston to make sliding contact with said interior surface to restrict passage of said liquid from within said dashpot chamber to said upper portion of said operating chamber above said piston.

6. An improved check valve in accordance with claim 1, wherein said means for limiting said rate includes said baffle plate having at least one hole therethrough to restrict passage of said liquid from said dashpot chamber to said lower portion of said operating chamber.

7. An improved check valve in accordance with claim 1, wherein said operating chamber has an upper portion with a uniform cross section centrally aligned with and larger than the effective cross section of a lower portion of said operating chamber to provide a transition shoulder therebetween and said baffle plate is held against said shoulder by a retaining ring means during valve operation.

8. An improved check valve in accordance with claim 7, wherein said retaining means includes a retaining ring which is received within a circumferential groove in said interior surface of said upper portion of said operating chamber.

9. An improved check valve in accordance with claim 1, wherein said other end of said cylindrical member is threaded to be received within a matching threaded hole in said piston.

* * * * *

UNITED STATES PATENT AND TRADEMARK OFFICE
CERTIFICATE OF CORRECTION

PATENT NO. : 4,046,164

DATED : September 6, 1977

INVENTOR(S) : Eldert B. Pool

It is certified that error appears in the above-identified patent and that said Letters Patent are hereby corrected as shown below:

Column 1, Line 19, delete "dics", after first occurrence, and insert --disc--.

Column 1, Line 37, after "valve" delete "the resulting differential pressure with the region above the valve".

*Signed and Sealed this*

*Twenty-first* Day of *March 1978*

[SEAL]

Attest:

RUTH C. MASON
*Attesting Officer*

LUTRELLE F. PARKER
*Acting Commissioner of Patents and Trademarks*